US008968624B2

(12) United States Patent
Tang

(10) Patent No.: US 8,968,624 B2
(45) Date of Patent: Mar. 3, 2015

(54) METHOD FOR PRODUCING A THREE DIMENSIONAL GREEN ARTICLE

(71) Applicant: National Taipei University of Technology, Taipei (TW)

(72) Inventor: Hwa-Hsing Tang, New Taipei (TW)

(73) Assignee: National Taipei University of Technology, Taipei (TW)

( * ) Notice: Subject to any disclaimer, the term of this patent is extended or adjusted under 35 U.S.C. 154(b) by 331 days.

(21) Appl. No.: 13/681,966

(22) Filed: Nov. 20, 2012

(65) Prior Publication Data

US 2013/0307175 A1 Nov. 21, 2013

(30) Foreign Application Priority Data

May 21, 2012 (TW) ............................ 101118038 A

(51) Int. Cl.

| | |
|---|---|
| ***B29C 67/00*** | (2006.01) |
| ***C04B 35/64*** | (2006.01) |
| ***B29C 67/24*** | (2006.01) |
| ***B28B 1/00*** | (2006.01) |
| ***B22F 3/00*** | (2006.01) |

(52) U.S. Cl.

CPC ............ *B29C 67/0081* (2013.01); *C04B 35/64* (2013.01); *B29C 67/242* (2013.01); *B28B 1/001* (2013.01); *B29C 67/0059* (2013.01); *B22F 3/008* (2013.01); *B22F 2999/00* (2013.01)

USPC ........................... 264/430; 264/482; 264/414

(58) Field of Classification Search

None

See application file for complete search history.

(56) References Cited

U.S. PATENT DOCUMENTS

| | | | | |
|---|---|---|---|---|
| 5,779,833 | A * | 7/1998 | Cawley et al. | 156/89.11 |
| 6,048,432 | A * | 4/2000 | Ecer | 156/263 |
| 2004/0075197 | A1* | 4/2004 | Tang | 264/430 |
| 2006/0119017 | A1* | 6/2006 | Tang | 264/642 |
| 2010/0323301 | A1* | 12/2010 | Tang | 430/325 |

OTHER PUBLICATIONS

Tang et al, Slurry-based additive manufacturing of ceramic parts by selective laser burn-out, Journal of the European Ceramic Society, vol. 35, Issue 3, Mar. 2015, pp. 981-987, ISSN 0955-2219, http://dx.doi.org/10.1016/j.jeurceramsoc.2014.10.019.*

Weisensel et al, Advanced Laminated Object Manufacturing (LOM) of SiSiC Ceramics, 15th Solid Freeform Fabrication Symposium 2004, Austin, TX, pp. 257-267.*

Rodrigues S, Chartoff RP, Klosterma DA, Agarwala M, Hecht N. Solidfreeform fabrication of functional silicon nitride ceramics by laminatedobject manufacturing. In: Bourell DL, et al., editors. Proceedings of the11th solid freeform fabrication symposium. Texas, USA: The University ofTexas at Austin; 2000. p. 1-8.*

* cited by examiner

*Primary Examiner* — Benjamin Schiffman

(74) *Attorney, Agent, or Firm* — Cesari and McKenna, LLP

(57) ABSTRACT

A method for producing a three dimensional green article includes: (a) providing a slurry composition that contains an inorganic powder, a binder, and a solvent; (b) forming a slurry layer made of the slurry composition; (c) removing the solvent of the slurry layer from an upper surface of the slurry layer so as to form the slurry layer into a green layer with a plurality of pores; (d) scanning the green layer with an energy beam having a power sufficient to vaporize or burn the binder such that the vaporized binder or the burnt binder escapes from the green layer through the pores, while leaving the inorganic powder which is not bound by the binder; and (e) repeating steps (b) to (d).

13 Claims, 8 Drawing Sheets

4
3
42(302)
31{311
312
41(301)

METHOD FOR PRODUCING A THREE DIMENSIONAL GREEN ARTICLE

CROSS-REFERENCE TO RELATED APPLICATION

This application claims priority of Taiwanese application no. 101118038, filed on May 21, 2012.

BACKGROUND OF THE INVENTION

1. Field of the Invention

This invention relates to a method for producing a green article, more particularly to a method for producing a three dimensional green article.

2. Description of the Related Art

Conventional methods for producing a three dimensional green article include a press-and-sinter fabrication (in which applying a high pressure is required), a powder injection molding process (in which applying a high pressure and adding a binder are required), and a slip casting process (in which a binder is used but application of pressure is not required). The step of applying a pressure requires a machine for producing pressure and a high-pressure-resistant die. In contrast, the process without pressure application merely requires a low pressure-resistant die (for example, a gypsum die for slip casting).

Recently, a rapid prototyping technology has been developed and is characterized by producing a three dimensional workpiece using a stacking principle. In general, the rapid prototyping technology involves moving a tool along a complicated two dimensional work path based on layer-slicing data stored in a computer to obtain a plurality of green layers, followed by stacking and interconnecting the green layers to form a three dimensional workpiece. The feature of such technology resides in that an extremely complicated shape of a workpiece can be made without using a die. Because no die is required, the process is a manufacturing method without pressure application, and thus, a binder is required to bind powder particles to form a green article. Thereafter, a step of densification sintering is performed to produce a workpiece having a desired strength.

In the rapid prototyping technology, the work path can be created using different tools, for example, a nozzle for a three dimensional printing (3DP) process, an extrusion head for a fused deposition modeling (FDM) process, and an energy beam for selective laser sintering (SLS) and stereo-lithography (SLA) processes. The process for producing a three dimensional green article using an energy beam may be classified into an additive process and a subtractive process. The feature of the additive process resides in that a part of the green layer that is scanned by the energy beam is bound to form a portion of the green article. Examples of the additive processes include SLA, SLS, and slurry based selective laser sintering processes. The feature of the subtractive process resides in that a part of the green layer that is scanned by the energy beam is removed and the other part that is not scanned by the energy beam becomes a portion of the green article. Examples of the subtractive processes include laminated object manufacturing (LOM) process, computer-aided manufacturing of laminated engineering material (CAM-LEM) process and the like.

Referring to FIG. 1, in US Patent Application Publication No. 2004/0075197, the applicant of this invention discloses a method for producing a green article 17, the method being based on the slurry based selective laser sintering process, and including following steps:

(A) mixing ceramic powder, a dissolving agent and oxide sol together to form a slurry composition 11;

(B) placing the slurry composition 11 on a platform 12 and moving a blade 13 along a horizontal direction (X) to pave the slurry composition 11 on the platform 12, thereby forming a slurry layer 14;

(C) irradiating the slurry layer 14 along a planar (i.e., two dimensional) predetermined scanning path using a laser beam 15, so that the oxide sol in the slurry layer 14 that is irradiated by the laser beam 15 is gelled to bind the ceramic powder, thereby forming a two dimensional ceramic green layer 16;

(D) repeating steps (B) and (C) for a predetermined number of times to form a plurality of green layers 16, followed by binding the green layers 16 using the laser beam 15 to form a three dimensional ceramic green article 17; and (E) after step (D), immersing the three dimensional ceramic green article 17 in water 18 to dissolve the un-gelled oxide sol, thereby obtaining the three dimensional ceramic green article 17.

In the method disclosed in US 2004/0075197, the slurry layer 14 is irradiated along a planar (i.e., two dimensional) predetermined scanning path in step (C). In particular, it is noted that the larger the volume of the finished ceramic green article 17, the larger will be the scanning area defined by the planar scanning path. Therefore, the work time for forming the finished ceramic green article 17 is expected to be relatively long.

From the above, it is desired to reduce the work time for producing a three dimensional ceramic green article so as to reduce costs for producing the three dimensional ceramic green article, thereby providing cost-effective advantage for the technology used to produce a large workpiece.

When a three dimensional workpiece is produced by LOM or CAM-LEM of the subtractive process, the linear workpiece profile is scanned by a laser, thereby saving the work time. However, the LOM process disclosed in U.S. Pat. No. 4,752,352 is suitable for producing a three dimensional workpiece using, e.g., paper, plastic, metal, or ceramic material. On the contrary, the CAM-LEM process disclosed in U.S. Pat. No. 5,779,833 is particularly suitable for producing inorganic green article.

The CAM-LEM process involves manufacturing thin sheets in an equipment (for example, a tape casting machine), and then cutting the sheets into cross sectional shapes of a workpiece using laser cutting equipment. Next, the sheets of the workpiece are laminated using a binder, followed by drying. Laminating processes are then performed repeatedly to form a three dimensional stack. Finally, the three dimensional stack is compressed through a press to enable the layers of the three dimensional stack to be in close contact with one another so as to bind them together in the subsequent sintering process. Therefore, the CAM-LEM process is complicated and is required to be performed at different working stations. Moreover, a plurality of equipments are also required in the CAM-LEM process.

The LOM process involves manufacturing thin sheets in an equipment (for example, a tape casting machine), and then adhering the sheets on a worktable, followed by cutting by laser. Although the LOM process requires less equipments and working stations, stacking and bonding the thin sheets is also required. Whether or not the bonding between the thin sheets is good may affect the microstructure of the green article and the sintering strength.

In U.S. Pat. No. 5,779,833, the thin sheets are bound by an adhesive layer disposed between the thin sheets or using a solvent to dissolve a binder in the thin sheets as an adhesive, and are pressed and heated to force the thin sheets to bind firmly. However, the adhesive layer is formed in the laminate thus made, and the microstructure of a green article made from the laminate may be non-uniform. Moreover, although use of the solvent may not change the composition of the green article and no adhesive layer is required, a longer time is necessary to dissolve the binder in the dry and hard thin sheet, and the binding strength cannot be properly controlled.

Since the thin sheets may not be in close contact by using the abovementioned processes, it is suggested that the stack of the thin sheets be further compressed in the CAM-LEM process. In this case, press and die are required. In addition, it is well known to a person skilled in the art that a stress gradient would be generated due to compression, thereby resulting in a non-uniform density. Although a more uniform density of the green article may be obtained by means of isostatic pressing, performing the isostatic pressing may increase equipment costs. In addition, since a die is required for the isostatic pressing, it is relatively inconvenient to provide a die specific for a workpiece with a complicated shape or fine features. A solution for the problem is to use a sacrificial material having a complementary cross section for the workpiece to form a simple square shape. Thus, a die used in the compressing process may have a simple square shape. The sacrificial material and the workpiece may be separated from each other after the compressing process is performed. However, the die is also required to be used in this process.

In view of the abovementioned CAM-LEM process, not only a large number of equipments are required, but also dies for the compressing step are required at a plurality of processing stations. Therefore, it is desirable to reduce the number of the required equipments, and to improve the bonding strength of the thin sheets without performing a compressing step and using a die.

SUMMARY OF THE INVENTION

Therefore, the object of the present invention is to provide a method for producing a three dimensional green article that can overcome the aforesaid drawbacks associated with the prior art.

According to this invention, a method for producing a three dimensional green article includes:

(a) providing a slurry composition that contains an inorganic powder, a binder, and a solvent;

(b) forming a slurry layer made of the slurry composition;

(c) removing the solvent of the slurry layer from an upper surface of the slurry layer so as to form the slurry layer into a green layer with a plurality of pores, the pores being interconnected and fluidly communicated with an upper surface of the green layer;

(d) scanning the green layer along a predetermined line-shaped first scanning path with an energy beam having a power sufficient to vaporize or burn the binder such that the vaporized binder or burnt binder escapes from the green layer through the pores, while leaving the inorganic powder which is not bound by the binder, wherein a scanned part of the green layer forms a first sacrificial region along the first scanning path, and an un-scanned part of the green layer is divided into a workpiece portion and a waste portion, the workpiece portion and the waste portion being separated from each other by the first sacrificial region; and (e) repeating steps (b) to (d), in which a plurality of green layers are formed one over the other and are scanned one after the other via multiple scanning steps.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 2:
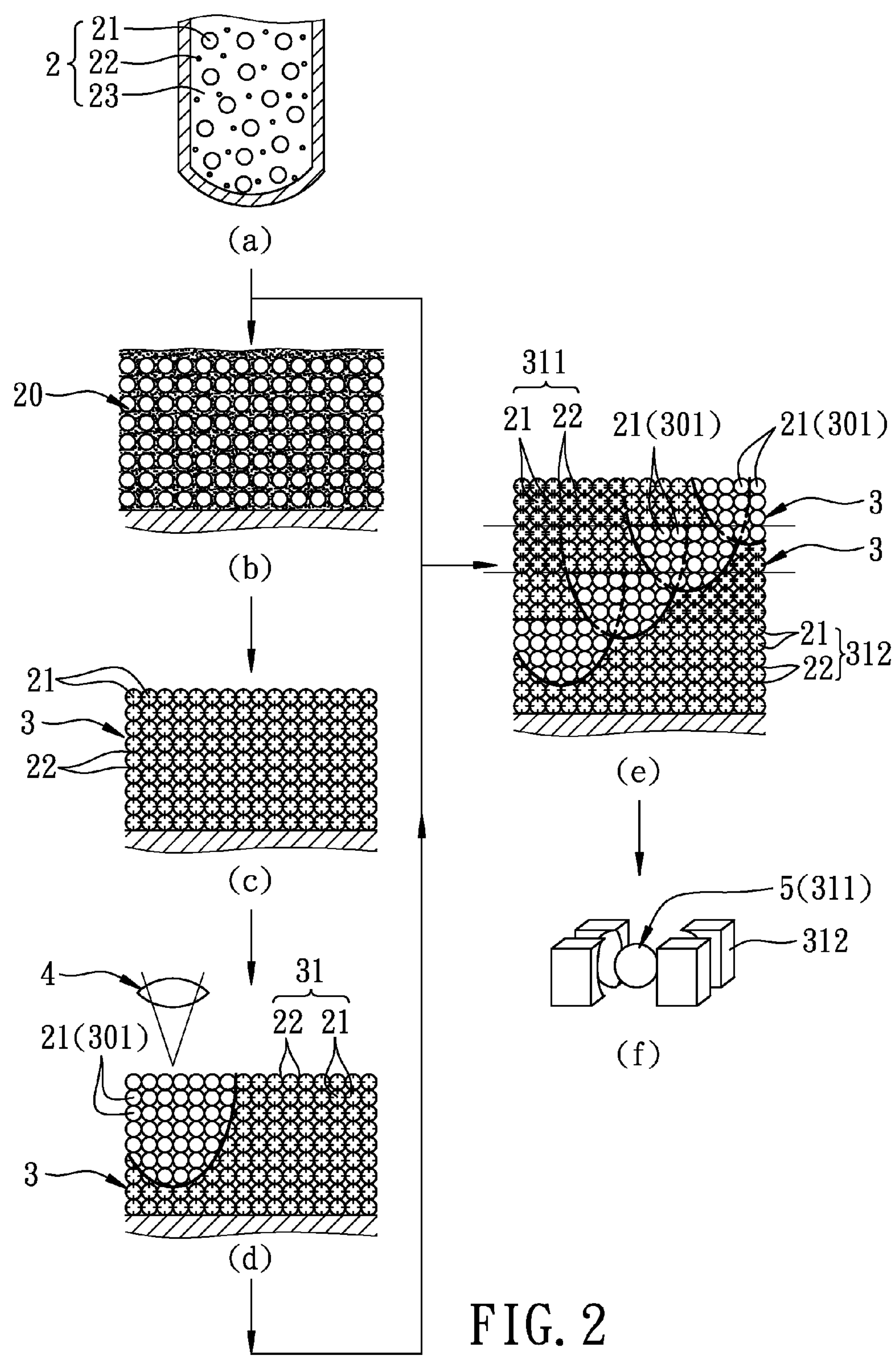
FIG. 2 is a flow diagram illustrating the preferred embodiment of a method for producing a three dimensional green article according to this invention.
Figure 3:
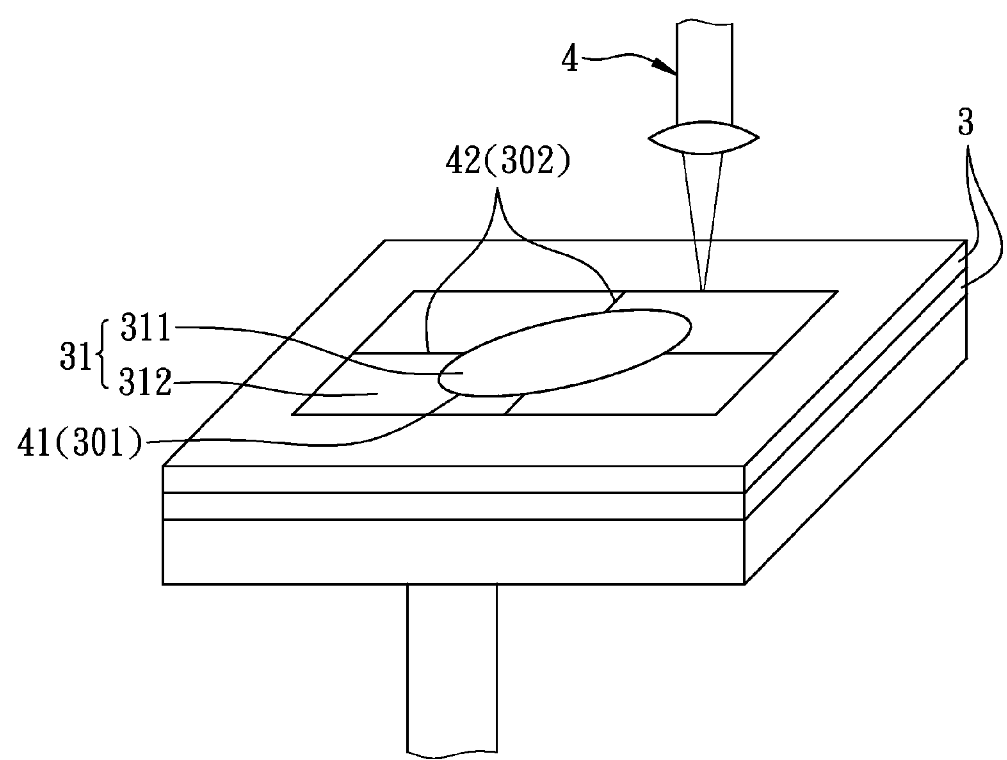
FIG. 3 is a schematic perspective view illustrating a scanning step of the preferred embodiment, in which an energy beam is used to scan a green layer along predetermined scanning paths.
Figure 4:
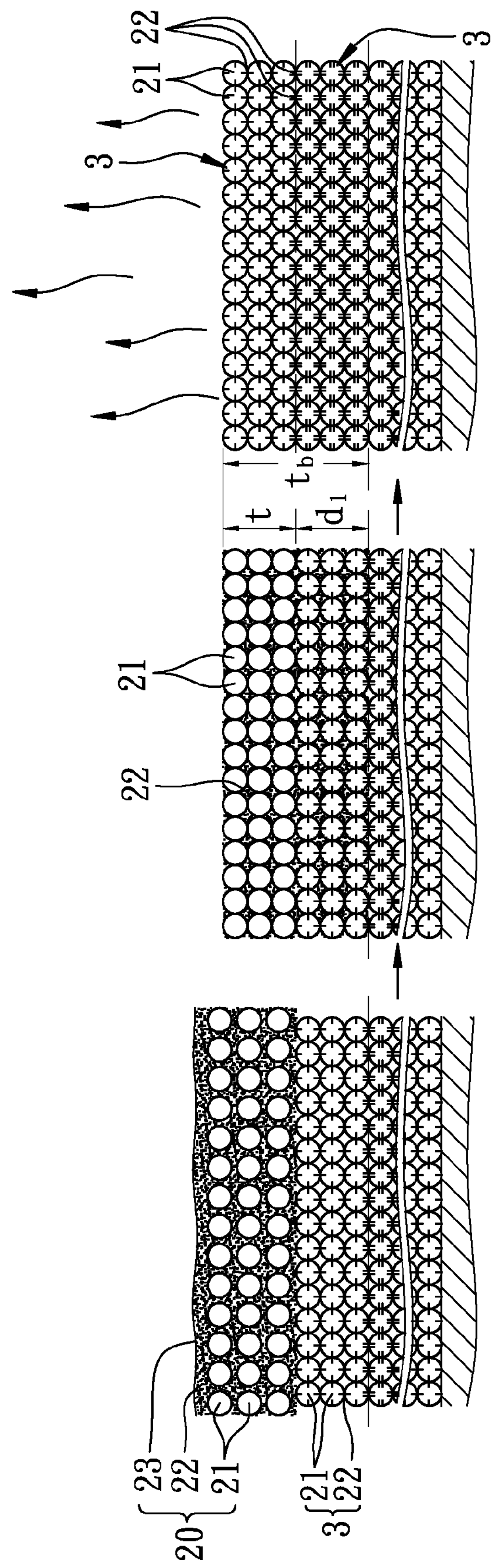
FIG. 4 is a flow diagram illustrating the seeping situation of a solvent and a binder and the bonding relationship between the binder and an inorganic powder when a step of forming a slurry layer and a step of removing the solvent of the slurry layer of the method of the preferred embodiment are conducted.

Referring to FIGS. 2, 3 and 4, the preferred embodiment of a method for producing a three dimensional green article 5 of this invention comprises:

(a) providing a slurry composition 2 that contains an inorganic powder 21, a binder 22, and a solvent 23;

(b) forming a slurry layer 20 made of the slurry composition 2 on a worktable;

(c) removing the solvent of the slurry layer from an upper surface of the slurry layer so as to form the slurry layer into a green layer with a plurality of pores, the pores being interconnected and fluidly communicated with an upper surface of the green layer;

(d) scanning the green layer along a predetermined line-shaped first scanning path with an energy beam having a power sufficient to vaporize or burn the binder such that the vaporized binder or burnt binder escapes from the green layer through the pores, while leaving the inorganic powder which is not bound by the binder, wherein a scanned part of the green layer forms a first sacrificial region along the first scanning path, and an un-scanned part of the green layer is divided into a workpiece portion and a waste portion, the workpiece portion and the waste portion being separated from each other by the first sacrificial region; and (e) repeating steps (b) to (d), in which a plurality of green layers 3 are formed one over the other and are scanned one after the other via multiple scanning steps.

Preferably, the preferred embodiment of the method of the present invention further comprises, after step (e), a step (f) of separating the workpiece portion 311 from the waste portion 312 along the first sacrificial region 301.

In the slurry composition 2, combination of the binder 22 and the solvent 23 is hereinafter referred to as a liquid.

Referring to FIG. 4, in step (e) during each repetition of step (b), after the slurry layer 20 is paved, a part of the solvent 23 and a part of the binder 22, i.e., a part of the liquid, in the slurry layer 20 will seep downwardly into the underlying green layer 3 with a depth of $d_1$.

During each repetition of step (c) in step (e), the solvent 23 is vaporized upwardly and thus pores that are interconnected and connected with the external environment are thus formed. As the solvent is evaporated in this step, the binder 22 which seeps into the underlying green layer 3 stays and binds to the inorganic powder 21 in the underlying green layer 3. At the same time, as the overlying slurry layer 20 is dried, i.e., the solvent is removed, a part of the binder 22 that does not seep downwardly binds to the inorganic powder 21 so as to form an overlying green layer 3. This dried green layer 3 has a thickness (t), which is thinner than the slurry layer 20. In this invention, the sum of d1 and t is referred to as a bonding thickness ($t_b$).

In this way, the overlying green layer 3 and the underlying green layer 3 form a seamless bond by virtue of the binder 22 that seeped into the underlying green layer 3.

The seeping depth (d1) is positively relative to amount of the solvent in the slurry layer 20. Large seeping thickness (d1) indicates a larger amount of the solvent, which results in a longer drying time and is likely to cause undesirable cracks in the green layer 3. In contrast, small seeping thickness (d1) indicates a small amount of the solvent. In such case, although drying time can be reduced, the green layer 3 thus formed may not have a smooth surface. Generally, the seeping thickness (d1) ranges between two and three times thickness (t) of the green layer 3. In principle, the seamless bond can be achieved when the seeping thickness (d1) is equal to the thickness (t) of the green layer 3. In such case, the drying time can be reduced. Therefore, preferably, the seeping thickness (d1) is equal to the thickness (t) of the green layer 3.

Figure 5:
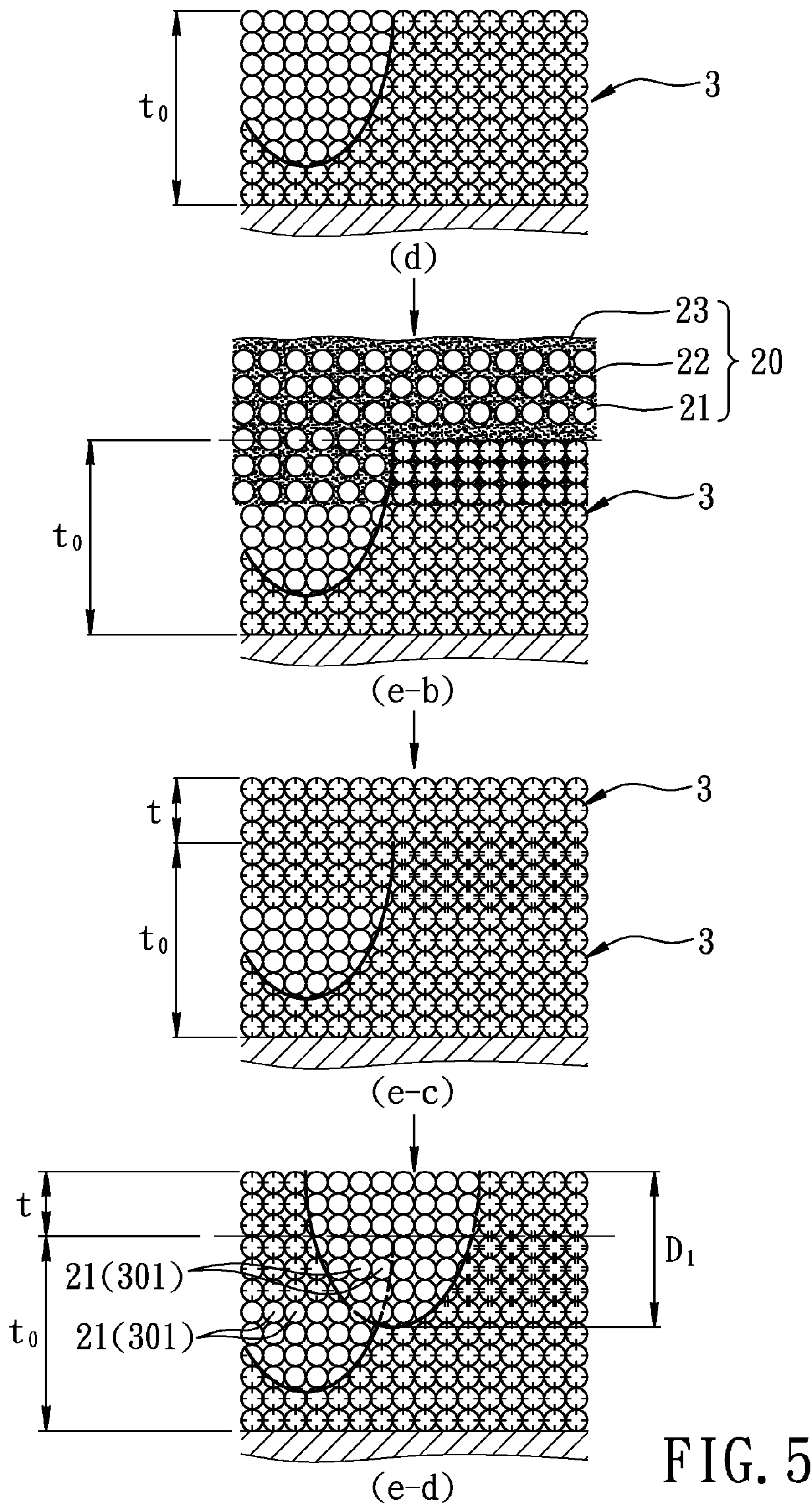
FIG. 5 is a flow diagram illustrating the relationship between two first sacrificial regions respectively formed in preceding and succeeding scanning steps.

Referring to FIG. 5, the green layer 3 formed in step (c), i.e., the lowermost one of the green layers 3, has a thickness ($t_0$), each of the green layers 3 formed in step (e) (see (e-c) in FIG. 5) has the thickness (t), and each of the first sacrificial regions 301 formed in the method of this invention has a depth ($D_1$) from an upper surface of a corresponding one of the green layers 3. Depth ($D_1$) can also be defined as a scanning depth of the laser beam. In this invention, the depth ($D_1$) is better to be larger than the thickness (t). Preferably, the laser scanning depth ($D_1$) is larger than or equal to the bonding thickness ($t_b$=t+d1).

It should be noted that, since the binder 22 in the scanned part, i.e., the first sacrificial regions 301, is vaporized or burnt, the binding strength of the powder 21 is relatively weak as compared to the un-scanned part (i.e., workpiece portion 311 and waste portion 312). In the case that D1 is greater than t and smaller than $t_b$, although the seeped binder 22 is not complete removed, the amount of the seeped binder 22 in the scanned part is still lower than that in the un-scanned part. Therefore, the binding strength of the powder 21 in the scanned part is weaker than that in the un-scanned part. When $D_1$ is greater than $t_b$, the seeped binder 22 in the scanned part is completely removed, and the binding strength in the scanned part is relatively weak (can be deemed to have almost no binding strength). Such two situations will be explained by the following examples.

It is noted that since the worktable may be uneven, a thick base layer may be formed. This base layer is made from a ceramic composition containing an inorganic powder, a binder, and a solvent. The inorganic powder, the binder, and the solvent in the ceramic composition can be the same as or different from those of the slurry composition 2.

The inorganic powder 21 employed in the preferred embodiment of the present invention may be a ceramic powder or a metal powder. In an example of the present invention, the inorganic powder 21 is a ceramic powder made of yttria partially stabilized zirconia (YPSZ). The binder 22 and the solvent 23 of the slurry composition 2 can be the ones that are commonly used in the field of green article. In the example of this invention, the binder is polyvinyl alcohol (PVA), and the solvent is water.

The energy beam 4 used in step (d) is a $CO_2$ pulse laser beam having a beam diameter typically ranging from 0.2 mm to 0.3 mm. When the green layer 3 is scanned with the $CO_2$ pulse laser beam, the laser scanning speed and the laser power must be controlled such that the binder 22 in the green layer 3 can be removed, while leaving the inorganic powder 21 which is not bound by the binder 22 in its original position.

The first scanning path 41 used in a succeeding one of the scanning steps (d) overlaps with the first scanning path 41 used in a preceding one of the scanning steps (d) such that the first sacrificial regions 301 formed in the preceding and succeeding steps (d) would overlap with each other.

It is noted that, in the first sacrificial region 301 formed in each repetition of step (d), the binder 22 in each of the green layers 3 is removed, and the inorganic powder 21 in each of the green layers 3 that is scanned by the energy beam 4 remains in its original position. Thus, the inorganic powder 21 of the green layer 3 can be used as a support for the slurry layer 20 formed thereon so that the slurry layer 20 in each repetition of step (b) can be successfully and evenly formed on the underlying green layer 3.

Preferably, in the slurry composition 2, the binder 22 is present in an amount ranging from 10% to 30% by volume based on the volume of the inorganic powder 21. The solvent 23 is present in an amount sufficient to bring the binder 22 of the slurry layer 20 to the underlying green layer 3 at a depth ($d_1$). As stated above, preferably, $d_1$ is equal to t.

Figure 1:
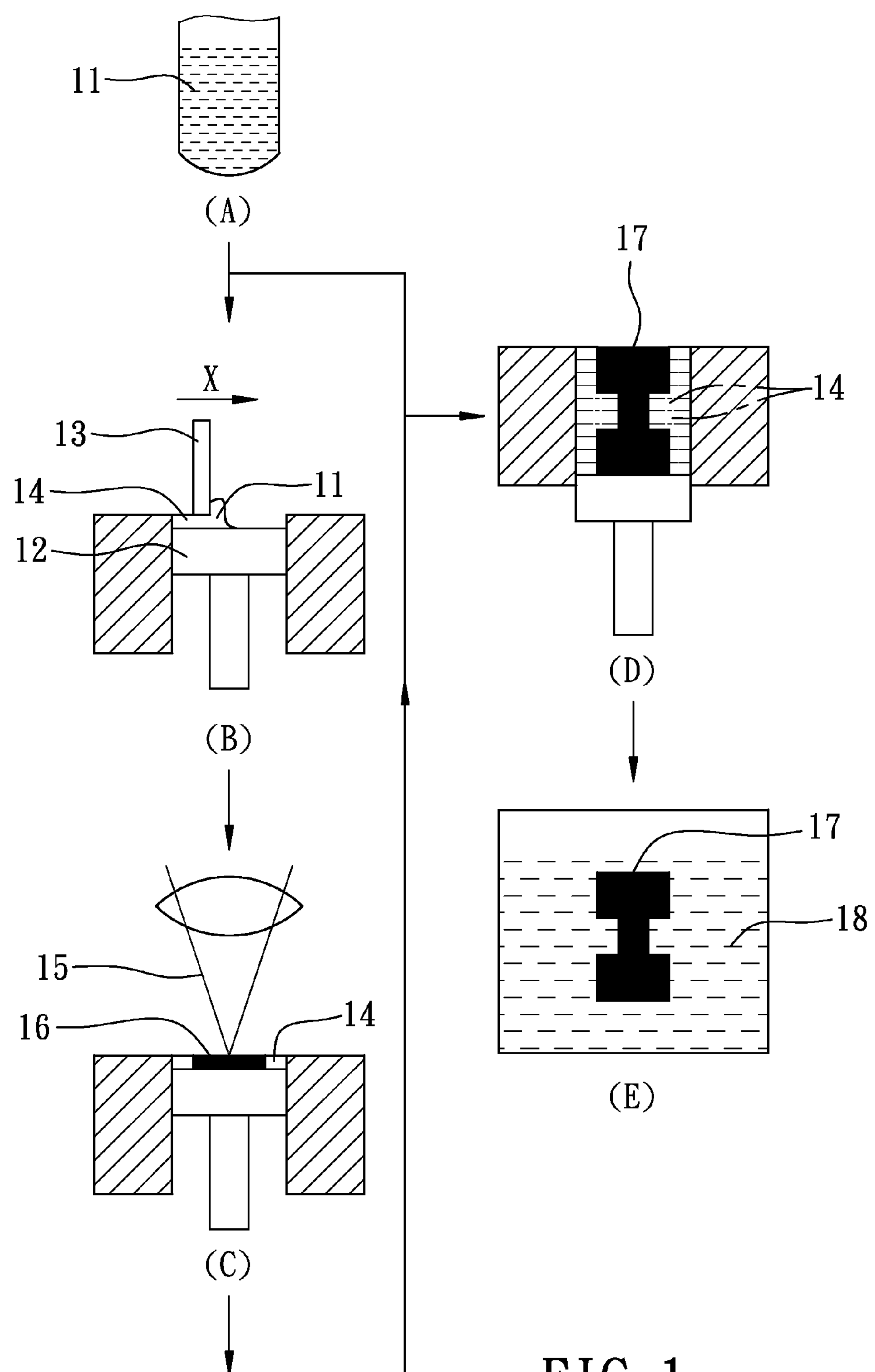
FIG. 1 is a flow diagram illustrating a method for producing an inorganic green article disclosed in US 2004/0075197.
Figure 6:
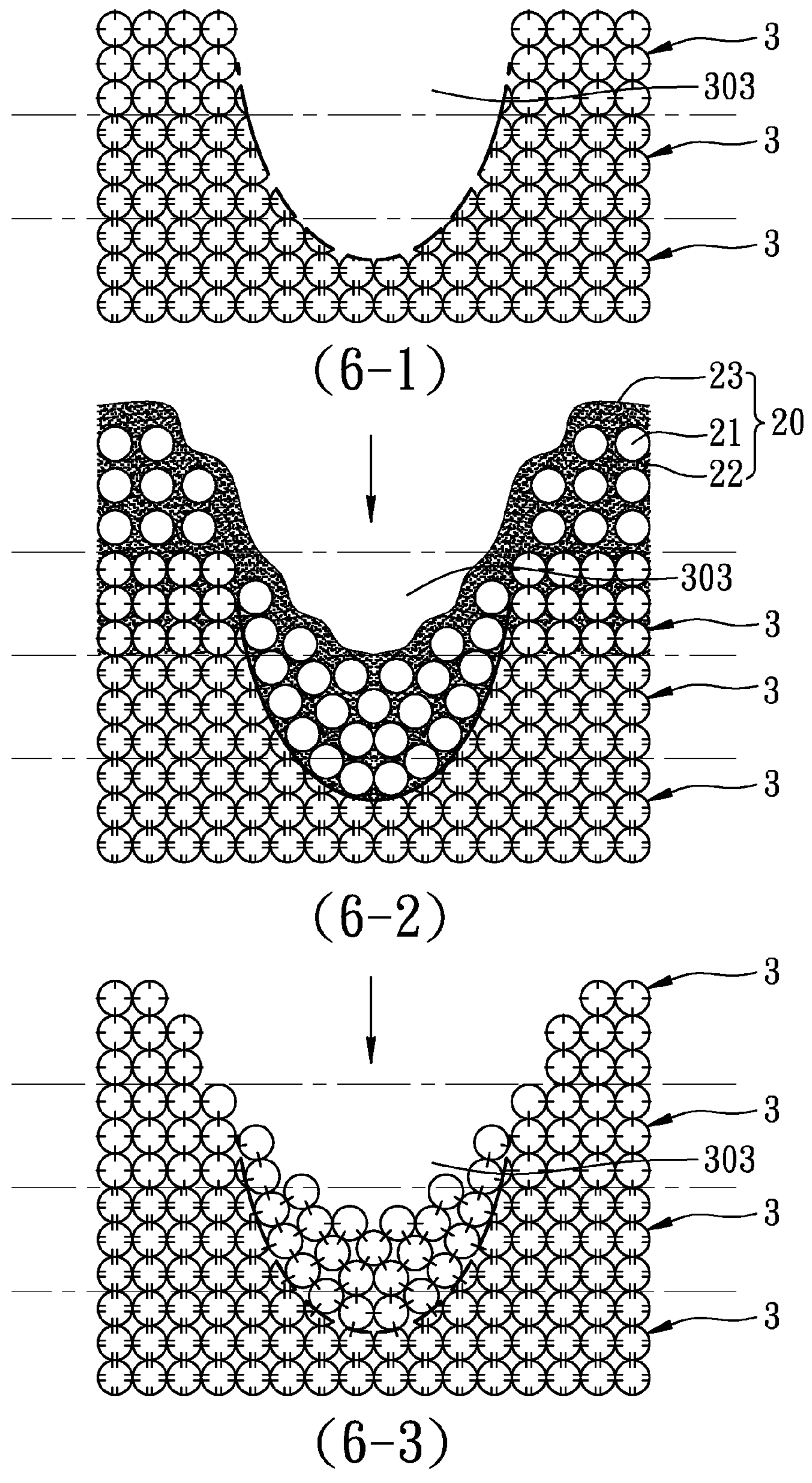
FIG. 6 illustrates the undesired burst phenomenon of the inorganic powder that is attributed to improper parameters used in the scanning step, and the undesired structure of a green layer.

As shown in FIG. 6, in the scanning steps (d), if the laser scanning speed and the laser power are not properly controlled, the inorganic powder 21 will burst, thereby forming a groove 303 in the scanned first sacrificial region 301, as shown in FIG. 6-1. Thereafter, the slurry layer 20 that is composed of the inorganic powder 21, the binder 22 and the solvent 23 and that is applied on the green layer 3 with the groove 303 will flow into the groove 303, as shown in FIG. 6-2. After the solvent 23 is removed, an uneven surface is obtained, as shown in FIG. 6-3. Thus, the shape of the green article 5 might be undesirably affected. Moreover, the materials filled in the grooves 303 contain a fraction of the binder 22 which is not the desired material for the first sacrificial region 301 of this invention. Therefore, the first sacrificial region 301 thus formed is uneven and is difficult to be removed due to the presence of the binder 22. In addition, as shown in FIG. 2(*e*), if a green article 5 with a slope is to be produced, a part of the overlying slurry layer 20 that is applied on and supported by the first sacrificial region 301 of the underlying green layer 3 is to be formed into a workpiece portion 311, i.e., a portion of the green article 5. Thus, if the inorganic powder 21 bursts and the groove 303 is formed, no suitable support is provided for the overlying slurry layer 20, and the workpiece portion 311 cannot be formed perfectly.

Although, in a conventional method, a sacrificial material can be filled into the groove 303 to support the overlying slurry layer 20, such step not only requires additional costs for processing time, the sacrificial material and tools for filling the sacrificial material into the groove 303 but also demands accurate technology for filling the sacrificial material into the tiny groove 303. In contrast, in the method of present invention, since the laser conditions are well controlled to keep the inorganic powder 21 in its original position, such additional step is not required. Thus, this invention provides a simple but effective solution.

Figure 7:
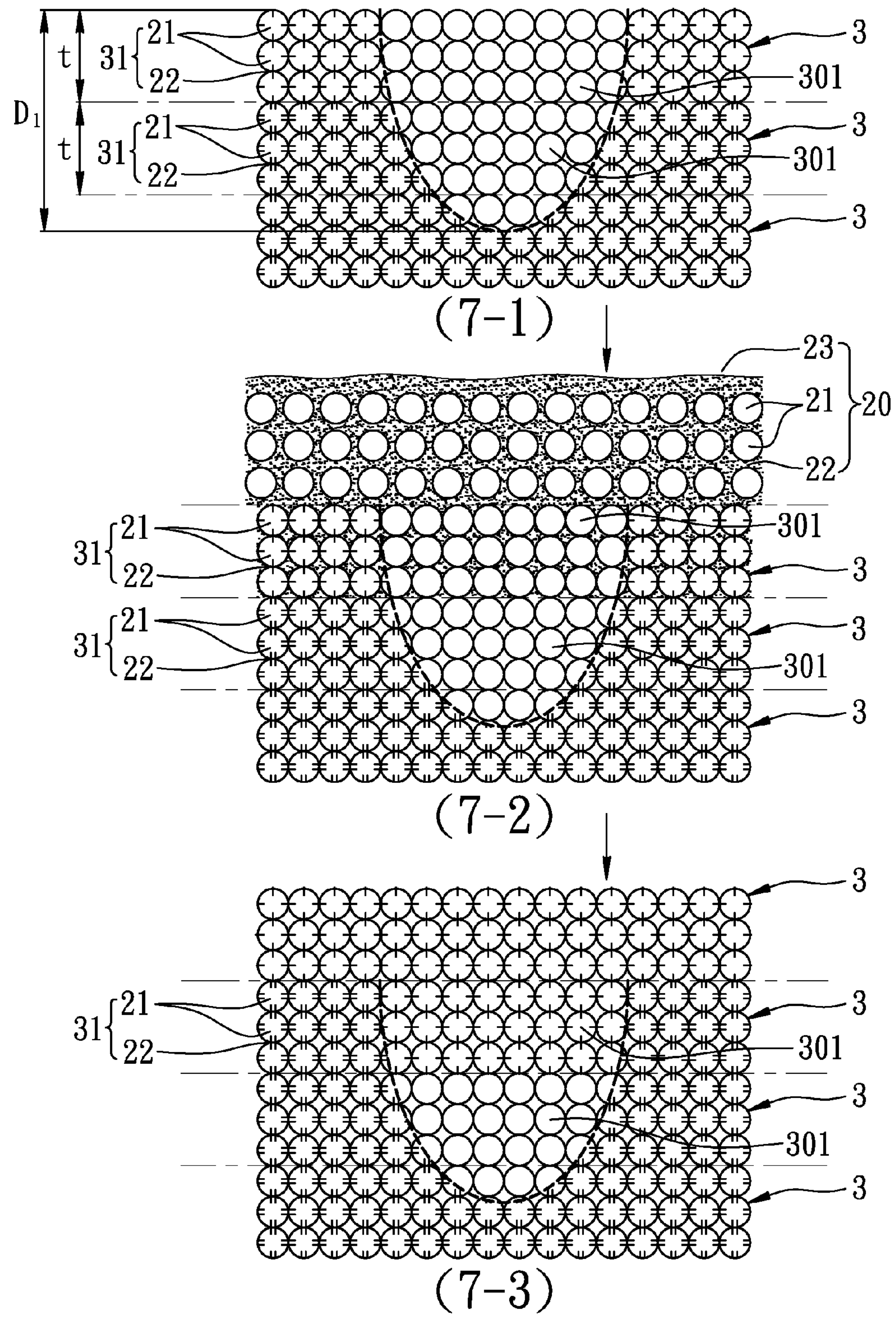
FIG. 7 is a flow diagram illustrating the perfect structure of the green layer that is produced when proper parameters are used in the scanning step of the method of the preferred embodiment.

FIG. 7 illustrates the perfect structure of the first sacrificial region 301, which is produced when proper parameters are used in the scanning step of the method of the preferred embodiment. FIG. 7-1 is a sectional view of the first sacrificial region 301 of the present invention. When a further slurry layer 20 is applied on the first sacrificial region 301, a part of the solvent 23 in the overlying slurry layer 20 will carry a part of the binder 22 to seep into the pores of the first sacrificial region 301 of the underlying green layer 3, while all of the inorganic powder 21, the residual binder 22 and the residual solvent 23 remain in the overlying slurry layer 20, as shown in FIG. 7-2. After removing the solvent 23, the binder 22 binds the overlying inorganic powder 21 and the inorganic powder 21 of the first sacrificial region 301 of the underlying green layer 3 (see FIG. 7-3). The first sacrificial region 301 of the underlying green layer 3 in this preferred embodiment provides a support function, and thus the overlying slurry layer 20 can be evenly paved. The resulting green layer 3 will be also evenly formed, and thus, a perfect green article 5 can be obtained.

As shown in FIG. 7-3, in this invention, seepage of the binder 22 and the solvent 23 of the overlying slurry layer 20 is controlled such that the first sacrificial region 301 (shown in FIG. 7-1) formed in the preceding one of the scanning steps (d) is not completely filled by the binder 22 and the solvent 23 that seep downwardly from the overlying slurry layer 20. Moreover, to render the first sacrificial regions 301 continuously connected, aside from the condition that the first scanning path 41 used in a succeeding one of the scanning steps (d) should overlap with the first scanning path 41 used in a preceding one of the scanning steps (d) as mentioned above, the depth ($D_1$) should be equal to or greater than bonding thickness ($t_b$=t+d1). When d1 is equal to t, $D_1$ is equal to or greater than 2t.

As shown in FIG. 2(*e*), based on the aforesaid specific design conditions, due to the first sacrificial regions 301 being continuously connected, the workpiece portions 311 and the waste portions 312 of the un-scanned parts 31 of the green layers 3 can be separated along the overlapped first sacrificial regions 301, so as to obtain the three dimensional green article 5.

Figure 8:
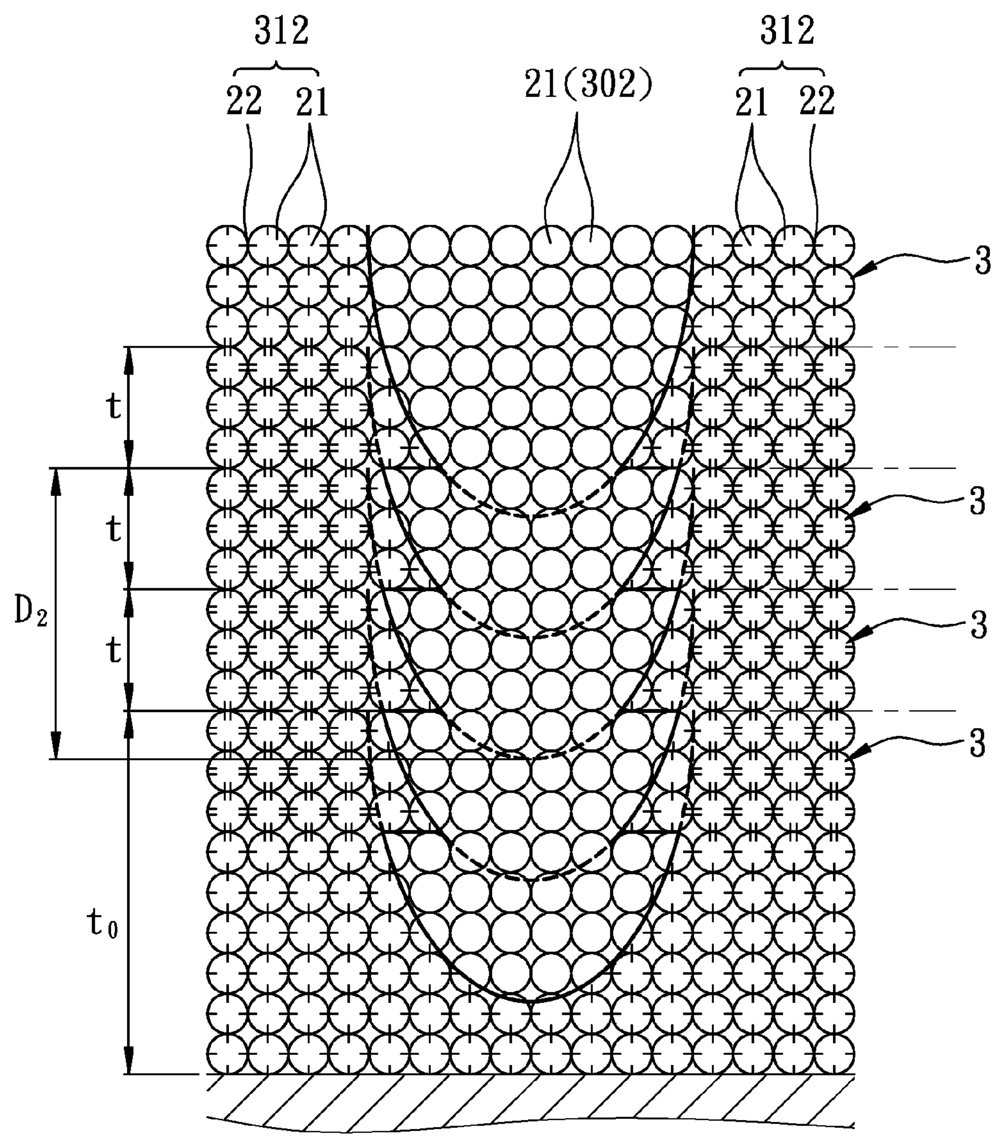
FIG. 8 is a diagram illustrating the relationship between several second sacrificial regions formed in successive scanning steps.

Referring to FIG. 3 and FIG. 8, in the preferred embodiment of the present invention, step (d) further includes scanning the waste portion 312 of the un-scanned part 31 of the green layer 3 along a predetermined line-shaped second scanning path 42 with the energy beam 4 having a suitable power and scanning speed so as to vaporize or burn the binder 22 such that the vaporized binder 22 or burnt binder 22 escapes from the green layer 3 through the pores, while leaving the inorganic powder 21 which is not bound by the binder 22 so as to form a second sacrificial region 302. The second scanning path 42 used in a succeeding one of the scanning steps overlaps the second scanning path 42 used in a preceding one of the scanning steps. In an example of this invention, the second scanning path 42 used in a succeeding one of the scanning steps is aligned completely with the second scanning path 42 used in a preceding one of the scanning steps. Each of the second sacrificial regions 302 formed in each repetition of step (d) has a depth ($D_2$) from an upper surface of a corresponding one of the green layers 3. The depth ($D_2$) is better to be larger than the thickness (t). As mentioned above, to render the two adjacent second sacrificial regions 302 overlap, it is preferable that $D_2$ is equal to or larger than the bonding thickness ($t_b$=t+d1).

Preferably, the inorganic powder 21 has an average particle size equal to or smaller than 1 μm so that a higher capillary attraction will produced among particles of the inorganic powder 21 to render the particles of the inorganic powder 21 to firmly abut against one another.

A feature of the present invention is that the solvent 23 carries the binder 22 to seep into the underlying green layer 3 such that the binder 22 binds to the underlying green layer 3, thereby causing any two adjacent ones of the green layers 3 to be bound seamlessly. However, if the binder 22 and the solvent 23 seep too deeply, removal of the same becomes more difficult. Meanwhile, the underlying first and second sacrificial regions 301, 302 might be completely re-filled with the binder 22 and the solvent 23, i.e., the property of the underlying first and second sacrificial regions 301, 302 originally merely composed of the inorganic powder becomes the property of the un-scanned part of the green layer, that is composed of the inorganic powder and the binder. This results in disappearance of the first and second sacrificial regions 301, 302, and thus, the structure of continuously connected first sacrificial regions 301 and the structure of continuously connected second sacrificial regions 302 may not be achieved and the desired shape of the green article 5 may not be obtained.

Furthermore, as mentioned above, the laser scanning depth ($D_1$) is better to be equal to or greater than $t_b$. If $t_b$ is too large, longer scanning time and larger laser power are required. Therefore, the content of the liquid in the slurry layer 20 should be as low as possible so long as the slurry layer 20 can be paved evenly.

The preferred bounding thickness ($t_b$) is 2t, i.e., d1 is equal to t. Using the following equation (a), the content of the liquid in the case of d1 being equal to t can be obtained.

$$V_b + V_s - V_v = V_v - \left\{\left[\frac{V_b}{(V_b + V_s)}\right] \times V_v\right\} \tag{a}$$

Equation (a) is used to describe the volume relationships in case of the slurry layer 20 paved on the un-scanned part (see FIG. 4). $V_b$ and $V_s$ are the volume of the binder 22 and the solvent 23 of each slurry layer 20, respectively, and $V_v$ is the void volume of the green layer 3 after the binder 22 is removed.

It should be noted that, the left side of the equation (a) which describes a volume of the seeped liquid and equals a total liquid volume minus void volume ($V_v$), is equal to the right side of the equation (a) which describes a volume of pores ($V_a$) formed in the underlying green layer 3 after the solvent 23 is removed (in which the binder 22 still remains).

If the volume of the binder ($V_b$) and the void volume ($V_v$) are given, the volume of the solvent ($V_s$) could be calculated based on equation (a).

Equation (a) is obtained by the following mathematical procedures.

If the volume of the green layer 3 is 100, and the void of the green layer 3 after the binder 22 is vaporized is 50 vol %, i.e., $V_v$ is 50, the volume of the inorganic powder ($V_p$) is 50. If, in the slurry composition 2, the binder 22 is 30% by volume based on the volume of the inorganic powder 21, $V_b$ should be 15. In addition, the unknown volume of the solvent ($V_s$) is set to be X.

From the above, the volume of the slurry layer 20 is $V_p$+$V_b$+$V_s$=(50+15+X), in which the volume of a liquid (i.e., the solvent and the binder) is $V_b$+$V_s$ (i.e., (15+X)). After the slurry layer 20 is applied on an underlying green layer 3, a part of the liquid will remain in the slurry layer 20 and the rest of the liquid will seep downwardly. Since $V_v$ is 50, the volume of liquid that remains in the overlying slurry layer 20 is 50 (i.e., equals to $V_v$), and the volume of the liquid that seeps into the underlying green layer 3 is $V_b+V_s-V_v$ (i.e., 15+X−50=X−35). The volume ratio of the binder 22 in the liquid is as follows.

$$\frac{V_b}{(V_b+V_s)}=\frac{15}{(15+X)}$$

Therefore, after the solvent 23 is removed from the liquid that remained in the overlying slurry layer 20, the volume of the binder 22 in the overlying green layer 3 is:

$$\left[\frac{V_b}{(V_b+V_s)}\right]\times V_v=\left[\frac{15}{(15+X)}\right]\times 50;$$

and the volume ($V_a$) of the pores in the overlying green layer 3 is:

$$V_v-\left[\frac{V_b}{(V_b+V_s)}\right]\times V_v=50-\left[\frac{15}{(15+X)}\right]\times 50.$$

After the solvent 23 is removed from the liquid that seeps downwardly into the underlying green layer 3, the volume of the binder 22 in the underlying green layer 3 is:

$$\left[\frac{V_b}{(V_b+V_s)}\right]\times(V_b+V_s-V_v)=\left[\frac{15}{(15+X)}\right]\times(15+X-35).$$

If another slurry layer 20 that has the above-mentioned slurry composition 2 is further applied, the volume of the liquid that seeps downwardly into the underlying green layer 3 will be X−35 (i.e., $V_b+V_s-V_v$), and the volume of the liquid, i.e., (X−35), should equal to the volume $V_a$ of the pores in the underlying green layer 3 (i.e., $$V_v-\left\{\left[\frac{V_b}{(V_b+V_s)}\right]\times V_v\right\}).$$

Therefore, equation (a) is thus obtained. By substituting the values of $V_b$ and $V_v$ into equation (a), the resultant equation becomes the following equation, and the volume (X) of the solvent 23 thus calculated is 77.

$$X-35=50-\left[\frac{15}{(15+X)}\right]\times 50$$

The abovementioned volume is calculated based on 100 parts by volume of the green layer 3. In terms of the volume percentage of the slurry composition 2, the slurry composition 2 contains 35.21 vol % of the inorganic powder 21, 10.56 vol % of the binder 22, and 54.23 vol % of the solvent 23.

For the abovementioned slurry composition 2, the green layer 3 formed by the uppermost slurry layer 20 after the solvent 23 is removed contains 50 vol % of inorganic powder 21, 8.15 vol % of the binder 22, and 41.85 vol % of pores. The void volume is equal to the sum of the binder volume and pore volume and therefore equals 50 vol %. Since d1 is equal to t, the volume percentage of the seeped liquid should be 41.85%. The volume ratio of the binder 22 in the slurry composition 2 is 0.163 (10.56 vol %/(10.56 vol %+54.23 vol %)), so that the volume percentage of the seeped binder is 6.82 vol % (41.85%×0.163). Thus, in the underlying green layer 3, the total volume percentage of the binder 22 is about 15% (6.819%+8.15%), the volume percentage of the inorganic powder 21 is 50 vol %, and the volume percentage of the pores is 35 vol %. As a result, using the aforesaid slurry composition 2, the uppermost one of the green layers 3 in the un-scanned part has 8.15 vol % of the binder 22, and each of the underlying green layers 3 in the un-scanned part has 15 vol % of the binder 22.

The volume percentage of the binder 22 in the scanned part of the green layer 3 can be calculated as follows with reference to FIG. 7.

It should be noted that the same slurry composition 2 which is calculated as explained above and applied on the un-scanned part will be used for calculation of the volume percentage of the binder 22 in the scanned part.

When the aforesaid slurry layer 20 is also paved on the scanned part (i.e., the first and second sacrificial regions 301, 302), a same amount of the liquid will seep into the underlying green layer 3 and will be 41.85 vol % ($V_b+V_s-V_v$=15+76.8−50=41.8). The content of the binder 22 in the seeped liquid is 6.82 vol % (41.85%×0.163). A same amount of the liquid will remain in the applied slurry layer 20 and will be 50 vol %. Therefore, the overlying green layer 3 in the scanned part contains 8.15 vol % of the binder 22 (50%×0.163).

If the laser scanning depth ($D_1$) is equal to thickness (t), the binder 22 in the sacrificial regions 301, 302 of the overlying green layer 3 that is just paved is completely removed, i.e., the content of the binder 22 is zero. In the sacrificial regions 301, 302 of the underlying green layer 3 not reached by the laser, 6.82% of the binder still remains. Thus, after the method is complete, each of the sacrificial regions 301, 302 has 6.82% of the binder 22 and the workpiece portion 311 has 15% of the binder 22. The content of the binder 22 in each of the sacrificial regions 301, 302 is about 45.5% of the content of the binder 22 in the workpiece portion 311, and thus the binding strength of each of the sacrificial regions 301, 302 is about 45.5% of that of the workpiece portion 311.

If the laser scanning depth ($D_1$) is equal to 2t, the binder 22 in the sacrificial regions 301, 302 of the overlying and underlying green layers 3 is completely removed. Therefore, the sacrificial regions 301, 302 contain no binder 22, whereas both of the workpiece portion 311 and the waste portion 312 contain 15% of the binder 22. In such circumstance, the workpiece portion 311 can be easily separated from the waste portion 312 via the first sacrificial regions 301 because of weak binding strength of the first sacrificial regions 301.

Based on the aforesaid, the sacrificial regions 301, 302 have relatively lower content of the binder 22 due to laser scanning, and the content of the binder 22 is decreased if the laser scanning depth ($D_1$) is increased.

In view of the above, the method of the present invention has the following features:

1. The method of this invention, i.e., forming the slurry layer 20, removing the solvent 23, and scanning the green layer 3, can be performed in one equipment. Therefore, the space occupied by the equipment used in the method of the present invention is much less than those of equipments used in the LOM process and the CAM-LEM process.

2. In this invention, the first scanning path is the linear workpiece profile, which is time-saving as compared to the planar scanning used in the prior art, e.g., US Application Publication No. 2004/0075197.

3. This invention provides good seamless bonding between the green layers 3 and can be used to produce a green article 5 having a complicated shape without performing a compressing step and using a die.

4. The green layer 3 is formed with a plurality of pores through which the vaporized binder or burnt binder can successfully escape out of the green layer 3 without causing damage to the green layer 3.

5. The sacrificial region 301, that is merely composed of the inorganic powder 21 without the binder 22, in each of the green layers 3 can be used as a support for the overlying slurry layer 20. Therefore, an even surface of the slurry layer 20 can be obtained and a green article 5 can be made smoothly.

EXAMPLE

An example of the method for producing a three dimensional green article 5 of the present invention is illustrated hereinbelow.

In the example, the inorganic powder 21, the binder 22, and the solvent 23 were YPSZ powder, polyvinyl alcohol (PVA), and deionized water, respectively. Two kinds of slurry compositions, i.e., a base ceramic slurry composition and a workpiece ceramic slurry composition 2 that was a material for the green article 5 of this invention, were prepared. Ingredients for the base ceramic slurry composition are shown in Table 1.

TABLE 1

| | YPSZ powder※ (10 μm) | Water | D134# (Dispersant) | PVA¥ |
|---|---|---|---|---|
| Weight (g) | 100 | 20 | 0.75 | 2.1 |

※commercially available from EE-Tec, Inc.
commercially available from Dai-ichi Kogyo Seiyaku Co., Ltd., Japan
¥commercially available from ChangChun Group, Model No. BF-24

Ingredients for the workpiece ceramic slurry composition 2 and the amounts and the adding sequence of the ingredients are shown in Table 2. The average particle size of the YPSZ powder is about 0.2 μm. The pH value of the workpiece ceramic slurry composition 2 is about 10.

To prepare the workpiece ceramic slurry composition 2 using the ingredients shown in Table 2, a relatively large amount of water was required. However, the large amount of water will cause the binder 21 in the workpiece ceramic slurry composition 2 to seep into an undesirable excessive thickness. Therefore, based on the abovementioned equation (a), after preparation of the workpiece ceramic slurry composition 2 was completed, the same was stirred at 50° C. to remove the excess water.

TABLE 2

| Addition sequence | Ingredients | Weight part | Weight (wt %) |
|---|---|---|---|
| 1 | Deionized water | 35 | 19.34 |
| 2 | D-134 dispersant | 0.75 | 0.42 |
| 3 | YPSZ powder | 100 | 55.26 |
| 4 | PVA | 2.7 | 1.49 |
| | Deionized water | 42 | 23.21 |

TABLE 2-continued

| Addition sequence | Ingredients | Weight part | Weight (wt %) |
|---|---|---|---|
| 5 | Silicon defoamer (KM-72-S&) | 0.5 | 0.28 |

&commercially available from SHIN-ETSU Chemical Co. Ltd.

The base ceramic slurry composition was applied on a worktable to form a base layer with a thickness of about 150 μm, followed by removing the deionized water in the base layer using a planar-shaped heater at 50° C.

Next, the workpiece ceramic slurry composition 2 was applied on the base layer to form a workpiece ceramic slurry layer 20, followed by removing the deionized water in the workpiece ceramic slurry layer 20 using the planar-shaped heater at 50° C. Subsequently, a further workpiece ceramic slurry composition 2 was applied and the deionized water was removed until a workpiece ceramic green layer 3 having 75 μm thickness (i.e., $t_0$) was obtained. When the further workpiece ceramic slurry composition 2 was applied on 75 μm of the workpiece ceramic green layer 3 (i.e., underlying workpiece ceramic green layer 3), a part of deionized water and a part of PVA seeped into the underlying workpiece ceramic green layer 3 to a depth of about 25 μm which was equal to the thickness (t) of the workpiece ceramic green layer 3 formed in the following step. As the deionized water was vaporized after heating, an overlying workpiece ceramic green layer 3 with a plurality of pores, that were fluidly communicated with the exterior environment, was obtained. After the deionized water was removed, the YPSZ powders in the overlying workpiece ceramic green layer 3 and the underlying workpiece ceramic green layer 3 were bound by PVA. Thus, seeping of PVA and deionized water and vaporization of the deionized water constitute a very important feature of the present invention. That is, seeping of PVA and deionized water and vaporization of the deionized water may control distribution of PVA and allow the workpiece ceramic green layer 3 to fluidly communicate with the external environment through the pores so as to form a seamless bond between the workpiece ceramic green layers 3, and to facilitate escape of the vaporized binder 22.

Next, the workpiece ceramic green layer 3 was scanned twice along a predetermined line-shaped first scanning path 41 with $CO_2$ pulse laser beam 4 having a power of 1.3 W at a scanning speed of 25 mm/sec to vaporize PVA such that the vaporized PVA escapes from the workpiece ceramic green layer 3 through the pores, while leaving the YPSZ powder which is not bound by PVA in its original position. The YPSZ powder which is not bound by PVA was used as a support for the workpiece ceramic slurry composition 2 applied subsequently. A scanned part of the workpiece ceramic green layer 3 forms a first sacrificial region 301 along the first scanning path 41, and an un-scanned part of the green layer 3 is divided into a workpiece portion 311 and a waste portion 312 that are separated from each other by the first sacrificial region 301. The first sacrificial region 301 has a depth ($D_1$) of 55 μm (i.e., $D_1>2t$) from an upper surface of the workpiece ceramic green layer 3.

Thereafter, the waste portion 312 was scanned along a plurality of predetermined line-shaped second scanning paths 42 with $CO_2$ pulse laser beam 4 having the same laser power and scanning speed as described above to vaporize PVA such that the vaporized PVA escapes from the workpiece ceramic green layer 3 through the pores, while leaving the YPSZ powder which is not bound by PVA so as to form a plurality of second sacrificial regions 302.

After the scanning step is completed, a procedure including the step of forming the workpiece ceramic slurry layer 20, the step of removing the deionized water, and the step of scanning with $CO_2$ pulse laser beam 4 was repeated 400 times, in which the first scanning path 41 used in a succeeding one of the scanning steps overlapped with the first scanning path 41 used in a preceding one of the scanning steps, and the second scanning paths 42 used in a succeeding one of the scanning steps were completely aligned with the second scanning paths 42 used in a preceding one of the scanning steps in a top-bottom direction.

It is noted that the function of the $CO_2$ pulse laser beam 4 is to produce a high temperature on the surface of the workpiece ceramic green layer 3, which in turn transfers downwardly from the surface to vaporize PVA in the workpiece ceramic green layer 3 to form the first and second sacrificial regions 301, 302. Therefore, the depths of the first and second sacrificial regions 301, 302 in the workpiece ceramic green layer 3 are determined by the laser power and scanning speed. Usually, the larger the amount of the vaporized gas per time unit, the easier the YPSZ powder structure is damaged that can cause YPSZ powder bursting phenomenon. Therefore, if deeper thicknesses of the first and second sacrificial regions 301, 302 are desired, multiple times of scanning are required. Based on this reason, in the example of the present invention, in each scanning step, the workpiece ceramic green layers 3 were scanned twice to achieve the desired depths of the first and second sacrificial regions 301, 302. In practice, if a smoke is produced, it indicates that PVA is vaporized. If there is no bursting phenomenon, it indicates that the YPSZ powder remains in the original position and an even workpiece ceramic slurry layer 20 can be applied smoothly on the underlying workpiece ceramic green layer 3 in the subsequent step.

Finally, the workpiece portions 311 were separated from the waste portions 312 of the workpiece ceramic green layers 3 to form a three dimensional ceramic (zirconium oxide) green article 5. It is further noted that PVA in the ceramic green article 5 can be heated to burn out completely in a furnace at 600° C. for 1 hour and the ceramic green article 5 may be further sintered in a sintering furnace so as to form a ceramic workpiece with increased mechanical strength.

The densification degrees of the ceramic green article 5 and the ceramic workpiece are 46.31% and 99.46%, respectively. According to three-point bend test (ASTM C 1161), the average strength of the sintered ceramic workpiece reaches 923.3 MPa. This reveals that, unlike the CAM-LEM process in which pressure should be applied, in the method of the present invention, the ceramic green article 5 with uniform density can be formed by means of thin layer lamination and laser burnout of PVA. In addition, a highly densified ceramic workpiece can be obtained after the ceramic green article 5 is sintered.

To sum up, in the method for producing a three dimensional green article 5 of the present invention, the green layer 3 is scanned along the first predetermined line-shaped scanning path 41 with an energy beam 4 having a power sufficient to vaporize the binder 22 so as to form the first sacrificial region 301 composed of the inorganic powder 21 which is not bound by the binder 22. As compared to the conventional method in which a planar (i.e., two dimensional) scanning path is used, the method of the present invention can save the scanning time, which is advantageous to produce a large workpiece. Furthermore, unlike the CAM-LEM process, in the method of the present invention, a ceramic green article 5 with uniform density can be obtained without applying pressure. In addition, a highly densified ceramic workpiece can be obtained after the ceramic green article 5 is sintered.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for producing a three dimensional green article comprising:

(a) providing a slurry composition that contains an inorganic powder, a binder, and a solvent;

(b) forming a slurry layer made of the slurry composition;

(c) removing the solvent of the slurry layer from an upper surface of the slurry layer so as to form the slurry layer into a green layer with a plurality of pores, the pores being interconnected and fluidly communicated with an upper surface of the green layer;

(d) scanning the green layer along a predetermined line-shaped first scanning path with an energy beam having a power sufficient to vaporize or burn the binder such that the vaporized binder or burnt binder escapes from the green layer through the pores, while leaving the inorganic powder which is not bound by the binder, wherein a scanned part of the green layer forms a first sacrificial region along the first scanning path, and an un-scanned part of the green layer is divided into a workpiece portion and a waste portion, the workpiece portion and the waste portion being separated from each other by the first sacrificial region; and (e) repeating steps (b) to (d), in which a plurality of green layers are formed one over the other and are scanned one after the other via multiple scanning steps.

2. The method of claim 1, wherein the first scanning path used in a succeeding one of the scanning steps overlaps with the first scanning path used in a preceding one of the scanning steps.

3. The method of claim 2, wherein each of the green layers formed in step (e) has a thickness (t), and each of the first sacrificial regions formed in step (e) has a depth ($D_1$) from an upper surface of a corresponding one of the green layers formed in step (e), the depth ($D_1$) being larger than or equal to the thickness (t).

4. The method of claim 3, wherein, in the slurry composition, the binder is present in an amount ranging from 10% to 30% by volume based on the volume of the inorganic powder, the solvent being present in an amount sufficient to bring the binder of the slurry layer to the underlying green layers formed in the preceding one of the scanning steps at a depth (d1).

5. The method of claim 4, wherein $D_1 \geq t + d1$.

6. The method of claim 5, wherein d1 is equal to t.

7. The method of claim 2, wherein the green layer formed in step (c) has a thickness ($t_0$), and $t_0 > 2t$.

8. The method of claim 1, wherein step (d) further includes scanning the waste portion along a predetermined line-shaped second scanning path with an energy beam having a power sufficient to vaporize or burn the binder such that the vaporized binder or burnt binder escapes from the green layer through the pores, while leaving inorganic particles of the inorganic powder which are not bound by the binder so as to form a second sacrificial region, and wherein the second scanning path used in a succeeding one of the scanning steps overlaps with the second scanning path used in a preceding one of the scanning steps in a top-bottom direction.

9. The method of claim 8, wherein each of the green layers formed in step (e) has a thickness (t), and each of the second sacrificial regions formed in step (e) has a depth ($D_2$) from an upper surface of a corresponding one of the green layers formed in step (e), the depth ($D_2$) being larger than or equal to the thickness (t).

10. The method of claim 9, wherein, in the slurry composition, the binder is present in an amount ranging from 10% to 30% by volume based on the volume of the inorganic powder, the solvent being present in an amount sufficient to bring the binder of the slurry layer to the underlying green layer formed in the preceding one of the scanning steps at a depth (d1).

11. The method of claim 10, wherein $D_2 \geq t + d1$.

12. The method of claim 1, further comprising, after step (e), a step (f) of separating the workpiece portion from the waste portion along the first sacrificial region.

13. The method of claim 1, wherein the inorganic powder has an average particle size not greater than 1 μm.

* * * * *